(12) United States Patent
Mellem

(10) Patent No.: US 9,643,535 B1
(45) Date of Patent: May 9, 2017

(54) VEHICLE STROBE BRAKE LIGHT

(71) Applicant: Bryan Mellem, Tomah, WI (US)

(72) Inventor: Bryan Mellem, Tomah, WI (US)

( * ) Notice: Subject to any disclaimer, the term of this patent is extended or adjusted under 35 U.S.C. 154(b) by 0 days.

(21) Appl. No.: 15/138,645

(22) Filed: Apr. 26, 2016

(51) Int. Cl.
*B60Q 1/44* (2006.01)
(52) U.S. Cl.
CPC .................................. *B60Q 1/448* (2013.01)
(58) Field of Classification Search
CPC combination set(s) only.
See application file for complete search history.

(56) References Cited

U.S. PATENT DOCUMENTS

| | | |
|---|---|---|
| 5,504,472 A | 4/1996 | Wilson |
| 5,801,624 A | 9/1998 | Tilly |
| D418,929 S | 1/2000 | Allen |
| 6,229,438 B1 | 5/2001 | Kutlucinar |
| 6,351,211 B1 | 2/2002 | Bussard |
| 6,445,289 B1 | 9/2002 | Roberts |
| 6,744,359 B1 | 6/2004 | Wasilewski |
| 2006/0022520 A1 | 2/2006 | Matheny |
| 2008/0079555 A1 | 4/2008 | Wang |
| 2016/0144778 A1* | 5/2016 | Tucker ..................... B60Q 1/52 340/471 |

* cited by examiner

*Primary Examiner* — Kabir A Timory
(74) *Attorney, Agent, or Firm* — Kyle A. Fletcher, Esq.

(57) ABSTRACT

The vehicle strobe brake light is a replacement device for a high mounted stop lamp in an automobile. The vehicle strobe brake light is a lighting unit that contains a plurality of brake lights and a strobe light. The plurality of brake lights operate as the normal brake lights of an automobile. The strobe light of the vehicle strobe brake light is designed to operate when the anti-lock braking system (hereinafter ABS) of the automobile. Specifically, the vehicle strobe brake light activates the strobe light when the ABS of the automobile is activated. The vehicle strobe brake light comprises a lighting unit and a control system.

11 Claims, 4 Drawing Sheets

VEHICLE STROBE BRAKE LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle lighting and optical signaling and lighting for vehicles, more specifically, a signaling device that indicates braking action.

SUMMARY OF INVENTION

The vehicle strobe brake light is a replacement device for a high mounted stop lamp in an automobile. The vehicle strobe brake light is a lighting unit that contains a plurality of brake lights and a strobe light. The plurality of brake lights operate as the normal brake lights of an automobile as described in the Federal Motor Vehicle Safety Standard 108 (FCR Title 49 Section 571.108 Oct. 1, 2011 see S5.5.4). The strobe light of the vehicle strobe brake light is designed to operate when the anti-lock braking system (hereinafter ABS) of the automobile. Specifically, the vehicle strobe brake light activates the strobe light when the ABS of the automobile is activated.

These together with additional objects, features and advantages of the vehicle strobe brake light will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle strobe brake light in detail, it is to be understood that the vehicle strobe brake light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle strobe brake light.

It is therefore important that the claims be regarded as including such equivalent construction insofar as they do not depart from the spirit and scope of the vehicle strobe brake light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
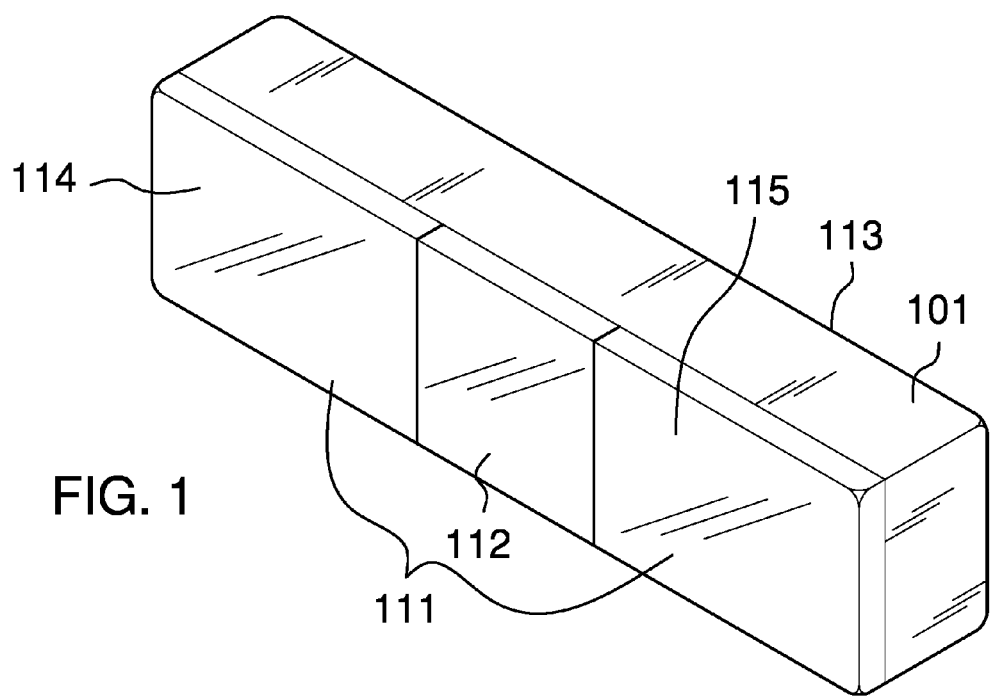
FIG. 1 is a perspective view of an embodiment of the disclosure.
Figure 2:
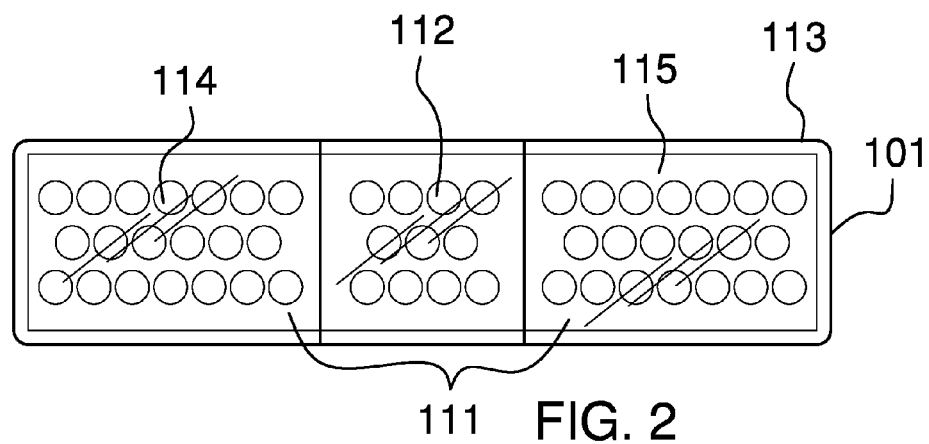
FIG. 2 is a front view of an embodiment of the disclosure.
Figure 3:
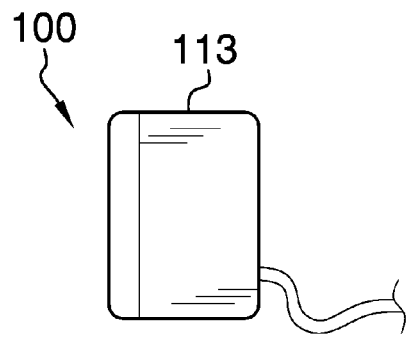
FIG. 3 is a side view of an embodiment of the disclosure.
Figure 4:
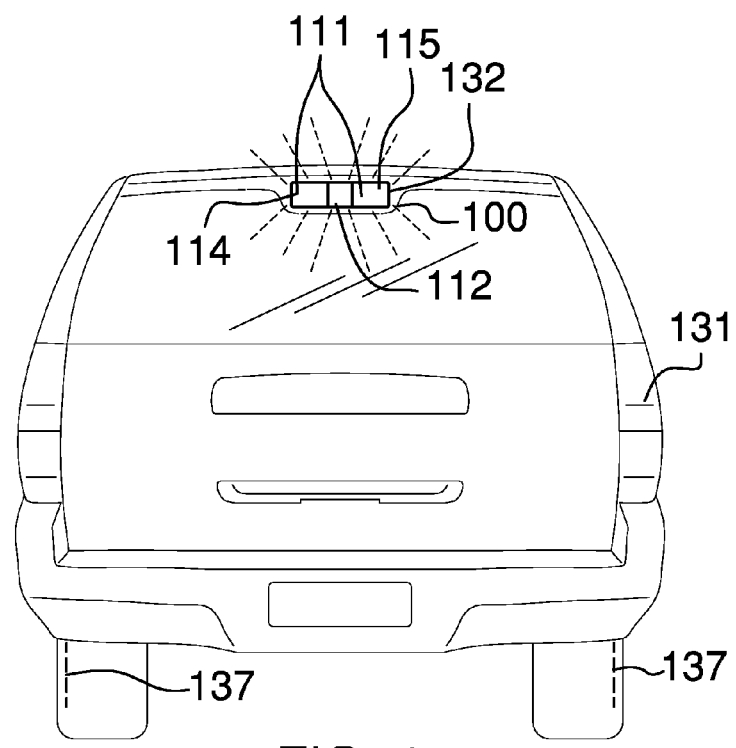
FIG. 4 is an in use view of an embodiment of the disclosure.
Figure 5:
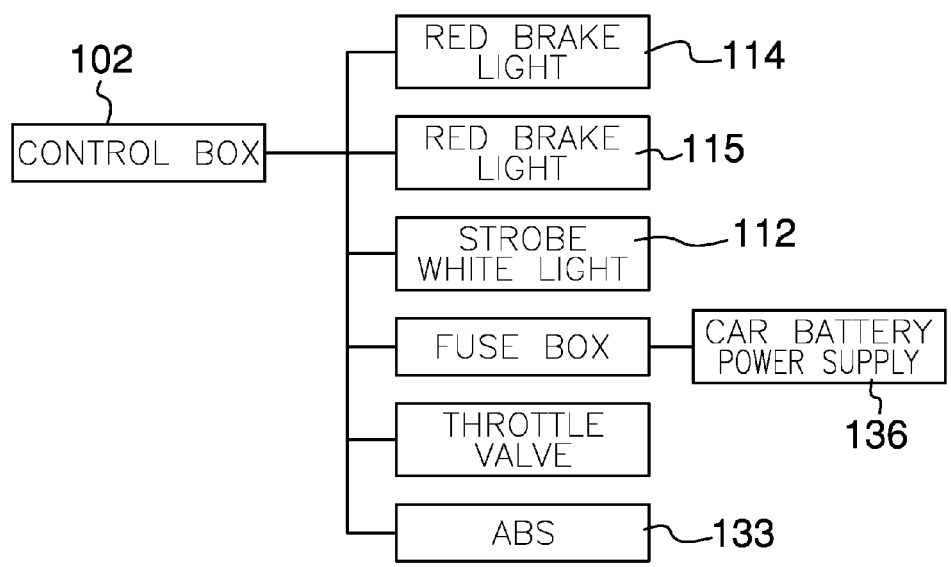
FIG. 5 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The vehicle strobe brake light 100 (hereinafter invention) comprises a lighting unit 101 and a control system 102. The invention 100 is adapted for use within the brake system 137 of an automobile 131. Specifically, the invention 100 is adapted for use with the high mounted brake signal 134 and the ABS signal 135 that are generated by the brake system 137 of an automobile 131. The invention 100 is a replacement device for a high mounted brake light 132 in an automobile 131. The invention 100 is a lighting unit 101 that contains a plurality of brake lights 111 and a strobe light 112. The plurality of brake lights 111 operate as the normal brake lights of an automobile 131. The strobe light 112 of the invention 100 is designed to operate when the anti-lock braking system 133 (hereinafter ABS) of the automobile 131 is activated. Specifically, the invention 100 activates the strobe light 112 when the ABS 133 of the automobile 131 is engaged.

The lighting unit 101 comprises a plurality of brake lights 111, a strobe light 112, and a housing 113. The housing 113 is a hollow container that is formed in the shape of a rectangular block. The housing 113 contains the plurality of brake lights 111 and the strobe light 112 in such a manner that the illuminations of the plurality of brake lights 111 and the strobe light 112 are visible during operation. The housing 113 further comprises all necessary accommodations to allow the lighting unit 101 to be mounted in rear of the automobile 131. Each of the plurality of brake lights 111 is a readily and commercially available LED brake light that meets all standards of the FMVSS 108. The strobe light 112 is a readily and commercially available strobe light.

In the first potential embodiment of the disclosure each of the plurality of brake lights 111 is an LED based brake light and the strobe light 112 is an LED based strobe light. The plurality of brake lights 111 further comprises a first brake light 114 and a second brake light 115. As shown most clearly in FIG. 2, the strobe light 112 is mounted between the first brake light 114 and the second brake light 115.

The control system 102 further comprises a high mounted brake switching element 121, an ABS switching element 122, a first circuit protection 123 and a second circuit protection 124. The high mounted brake switching element 121 is linked to the high mounted brake signal 134 such that the high mounted brake switching element 121 will close in order to complete the electric circuit that illuminates the first brake light 114 and the second brake light 115. The ABS switching element 122 is linked to the ABS signal 135 such that the ABS switching element 122 will close in order to complete the electric circuit that activates and illuminates the strobe light 112. The first circuit protection 123 is a fuse or circuit breaker that protects the automobile electrical system 136 and the first brake light 114 and the second brake light 115 from over currents. The second circuit protection 124 is a fuse or circuit breaker that protects the automobile electrical system 136 and the strobe light 112 from over currents.

Figure 6:
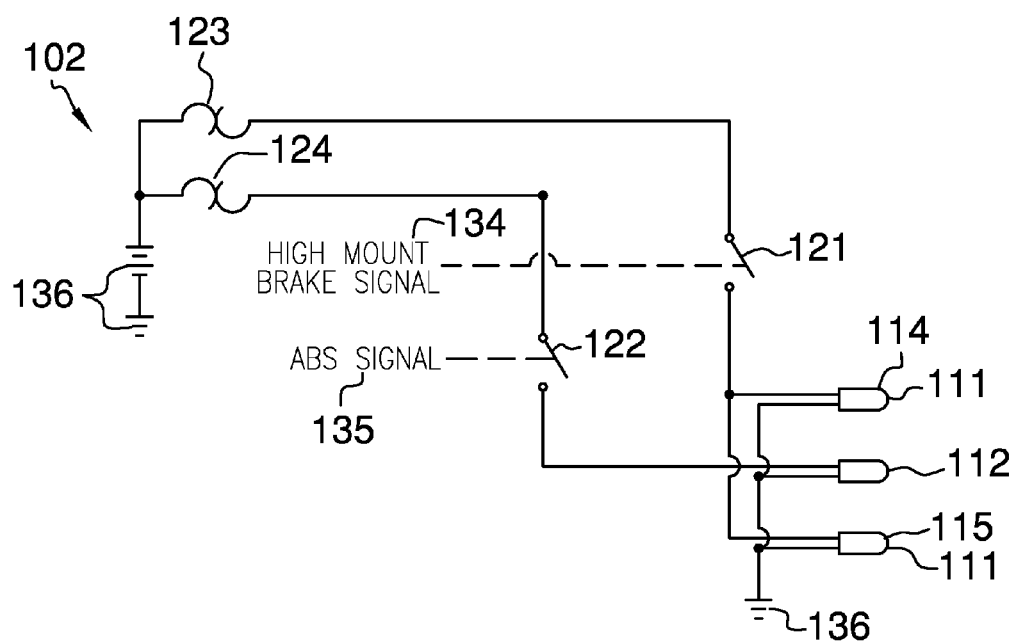
FIG. 6 is a schematic of an embodiment of the disclosure.

As shown most clearly in FIG. 6, in the first potential embodiment of the disclosure, the first circuit protection 123, the high mounted brake switching element 121, the plurality of brake lights 111 are connected in series. Each of the plurality of brake lights 111 are connected in parallel with each other. The second circuit protection 124, the ABS switching element 122 and the strobe light 112 are connected in series.

From the driver's perspective, the operation of the brake system 137 remains unchanged after the invention 100 is installed.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, and minivans.

FMVSS: As used in this disclosure, FMVSS is an abbreviation for Federal Motor Vehicle Safety Standard.

Housing: As used in this disclosure, a housing is a rigid casing that encloses and protects one or more devices.

LED: As used in this disclosure, an LED is an acronym for a light emitting diode. A light emitting diode is a 2 lead semiconductor that is also a light source.

Relay: As used in this disclosure, a relay is an automatic electromagnetic or electromechanical device that reacts to changes in voltage or current by opening or closing a switch in an electric circuit.

Strobe Light: As used in this disclosure, a strobe light is a device that is used to generate flashes of light at regular intervals.

Switch: As used in this disclosure, a switch is an electrical device that starts and stops the flow of electricity through an electric circuit.

Switching Element: This is a device that closes and opens an electrical circuit in response to an electrical control signal. Examples of switching elements include, but are not limited to, relays and transistors.

Vehicle: As used in this disclosure, a vehicle is a device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling device comprising:
a lighting unit and a control system;
wherein the signaling device is adapted for use within a brake system of an automobile;
wherein the signaling device is adapted to replace a high mounted brake signal generated via the brake system of said automobile;
wherein the signaling device is adapted for use with an ABS signal generated via the brake system of said automobile;
wherein the lighting unit further comprises a strobe light;
wherein the strobe light operates when the ABS signal is engaged;
wherein the lighting unit further comprises a plurality of brake lights and a housing;
wherein the housing contains the plurality of brake lights and the strobe light;
wherein the housing is a hollow container that is formed in the shape of a rectangular block;
wherein the housing contains the plurality of brake lights and the strobe light such that the illuminations of the plurality of brake lights and the strobe light are visible during operation;
wherein the housing further comprises all necessary accommodations to allow the lighting unit to be mounted in rear of the automobile;
wherein each of the plurality of brake lights is a LED based brake light;
wherein the strobe light is a LED based strobe light;
wherein the plurality of brake lights further comprises a first brake light and a second brake light;
wherein the strobe light is mounted into the housing between the first brake light and the second brake light;
wherein the control system further comprises a high mounted brake switching element, an ABS switching element, a first circuit protection and a second circuit protection assembled into an electric circuit.

2. The signaling device according to claim 1 wherein the high mounted brake switching element is linked to the high mounted brake signal such that the high mounted brake switching element will close.

3. The signaling device according to claim 2 wherein when the high mounted brake switching element closes a circuit that illuminates the first brake light and the second brake light is completed.

4. The signaling device according to claim 3 wherein the ABS switching element is linked to the ABS signal such that the ABS switching element will close.

5. The signaling device according to claim 4 wherein when the ABS switching element closes a circuit the illuminates the strobe light is completed.

6. The signaling device according to claim 5 wherein the plurality of brake lights are wired in parallel.

7. The signaling device according to claim 6 wherein the first circuit protection, the high mounted brake switching element are connected in series with the plurality of brake lights.

8. The signaling device according to claim 7 wherein the second circuit protection, the ABS switching element and the strobe light are connected in series.

9. The signaling device according to claim 8
wherein the first circuit protection is selected from the group consisting of a fuse or circuit breaker;
wherein the second circuit protection is selected from the group consisting of a fuse or circuit breaker.

10. The signaling device according to claim 9 wherein the high mounted brake switching element is a first relay;
wherein the ABS switching element is a second relay.

11. The signaling device according to claim 9 wherein the high mounted brake switching element is a first transistor;
wherein the ABS switching element is a second transistor.

* * * * *